United States Patent
Acheson et al.

(10) Patent No.: US 10,657,119 B1
(45) Date of Patent: May 19, 2020

(54) FLEET NODE MANAGEMENT SYSTEM

(71) Applicant: Amazon Technologies, Inc., Seattle, WA (US)

(72) Inventors: Alazel Acheson, Redmond, WA (US); David Carroll, Seattle, WA (US); Christopher Andrew Stephens, Issaquah, WA (US); Seth William Markle, Seattle, WA (US); Jonathan Herman, Seattle, WA (US); Mihir Dharamshi, Redmond, WA (US); Rajesh Sampath, Redmond, WA (US); Shreeranga Puttur Ramakrishna, Redmond, WA (US); Rameez Sajwani, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 519 days.

(21) Appl. No.: 14/975,353

(22) Filed: Dec. 18, 2015

(51) Int. Cl.
  *G06F 40/197* (2020.01)
  *G06F 16/23* (2019.01)

(52) U.S. Cl.
  CPC .......... *G06F 16/2329* (2019.01); *G06F 16/23* (2019.01)

(58) Field of Classification Search
  CPC ......... G06F 17/30575; G06F 17/30194; G06F 17/30578; G06F 16/2329; G06F 16/23; H04L 67/104
  See application file for complete search history.

(56) References Cited

U.S. PATENT DOCUMENTS

| | | | |
|---|---|---|---|
| 6,411,967 B1 * | 6/2002 | Van Renesse | .... G06F 17/30575 707/625 |
| 8,589,574 B1 | 11/2013 | Cormie et al. | |
| 8,654,650 B1 | 2/2014 | Vermeulen et al. | |
| 8,694,639 B1 | 4/2014 | Vermeulen et al. | |
| 8,719,432 B1 | 5/2014 | Vermeulen et al. | |
| 8,843,441 B1 * | 9/2014 | Rath | ................. G06F 17/30578 707/614 |
| 2007/0168516 A1 | 7/2007 | Lie et al. | |
| 2009/0172191 A1 | 7/2009 | Dumitriu et al. | |
| 2011/0093743 A1 * | 4/2011 | Arcese | ...................... G06F 8/61 714/18 |
| 2011/0246826 A1 | 10/2011 | Hsieh et al. | |
| 2012/0144018 A1 * | 6/2012 | Fried | .................. H04L 12/6418 709/224 |
| 2014/0123123 A1 | 5/2014 | Bahls | |
| 2014/0310243 A1 | 10/2014 | McGee et al. | |

OTHER PUBLICATIONS

Maarten Koopmans (CloudDrive-Gossiper, May 6, 2012).*

* cited by examiner

*Primary Examiner* — Shew Fen Lin
(74) *Attorney, Agent, or Firm* — Robert C. Kowert; Kowert, Hood, Munyon, Rankin & Goetzel, P.C.

(57) ABSTRACT

A fleet node management system may include a metadata store, a plurality of fleet nodes, and one or more metadata mutation devices. The metadata store may be configured to store dynamic metadata. The plurality of fleet nodes may be configured to determine, based on a gossip protocol, whether to continue performance of a function that uses a local version of the metadata. The one or more metadata mutation devices may be configured to determine, based on a global state of the fleet nodes, whether to modify the dynamic metadata for the fleet nodes.

20 Claims, 6 Drawing Sheets

FLEET NODE MANAGEMENT SYSTEM

BACKGROUND

Distributed systems offer a host of advantages to users. For example, distributed systems provide opportunities to balance workload performed among different nodes, systems, or devices, in order to optimize various different functions, such as performing read or write requests. Risk of failure may be dispersed among different nodes so that one or more individual failures may be tolerated in the distributed system. Additionally, distributed systems may be scaled more easily than traditional monolithic systems in order to account for growing computational and other resource demands. In the face of these appealing benefits, various different implementation challenges for distributed systems may occur.

Coordination problems between various nodes can, for example, occur, especially when operating on or otherwise using a common or shared set of data. For example, in various systems, updates may be propagated to the nodes at differing timings. As a result, nodes intended to work similarly may instead work inconsistently due to using different data. To illustrate, in a routing system, shared metadata may be used to tell routers where to find various endpoints. However, if the shared metadata differs between two nodes, data may be misplaced or otherwise lost. Additionally, the nodes may be unable to determine that the nodes are operating using obsolete data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In some cases, when a copy (e.g., a master copy) of dynamic metadata is modified, a distributed system that performs functions using local copies of the dynamic metadata may perform the functions inconsistently. For example, in a routing system where a plurality of routers use local copies of routing metadata to locate endpoints, a modification to an address of an endpoint in the metadata may result in one router routing requests thinking that the endpoint is located at one address and another router routing requests thinking that the endpoint is located at another address. As a result, some requests may be incorrectly routed and may be mishandled (e.g., data may be misplaced and lost).

The systems and methods described herein manage functions performed by a plurality of fleet nodes based on metadata. In some embodiments, the fleet nodes are configured to determine whether the fleet nodes should continue to perform a function relating to metadata or whether the fleet nodes should halt performance of the function. In some embodiments, a metadata mutation device is configured to determine whether a modification to the metadata should be made based at least in part on a global state of the fleet nodes. In many cases, errors associated with fleet nodes failing to receive timely metadata updates may be prevented. Additionally, the system may refrain from modifying the metadata in an unsafe manner (e.g., by preventing mapping changes that would result in requests being improperly routed to the wrong device without an error being detected).

As described in more detail herein, the system includes a metadata store (e.g., a metadata repository) that may store dynamic metadata, a plurality of fleet nodes that may store local versions of the dynamic metadata and may perform a function based on the local versions, and one or more metadata mutation devices that may modify the dynamic metadata. The metadata store, the plurality of fleet nodes, and the one or more metadata mutation devices may be implemented in a same group of one or more computer devices or may be implemented on different groups of one or more computer devices. Additionally, the metadata store, the plurality of fleet nodes, and the one or more metadata mutation devices may respectively be distributed amongst multiple computer devices. For example, a portion of the metadata store that stores one portion of the dynamic metadata may be implemented on one computer device and a portion of the metadata store that stores another portion of the dynamic metadata may be implemented on another computer device. As described further below, the one or more computer devices may also perform other functions (e.g., load balancing) within the system. Although specific configurations of the system are described herein, combinations of portions of the configurations described herein are also contemplated.

Figure 1:
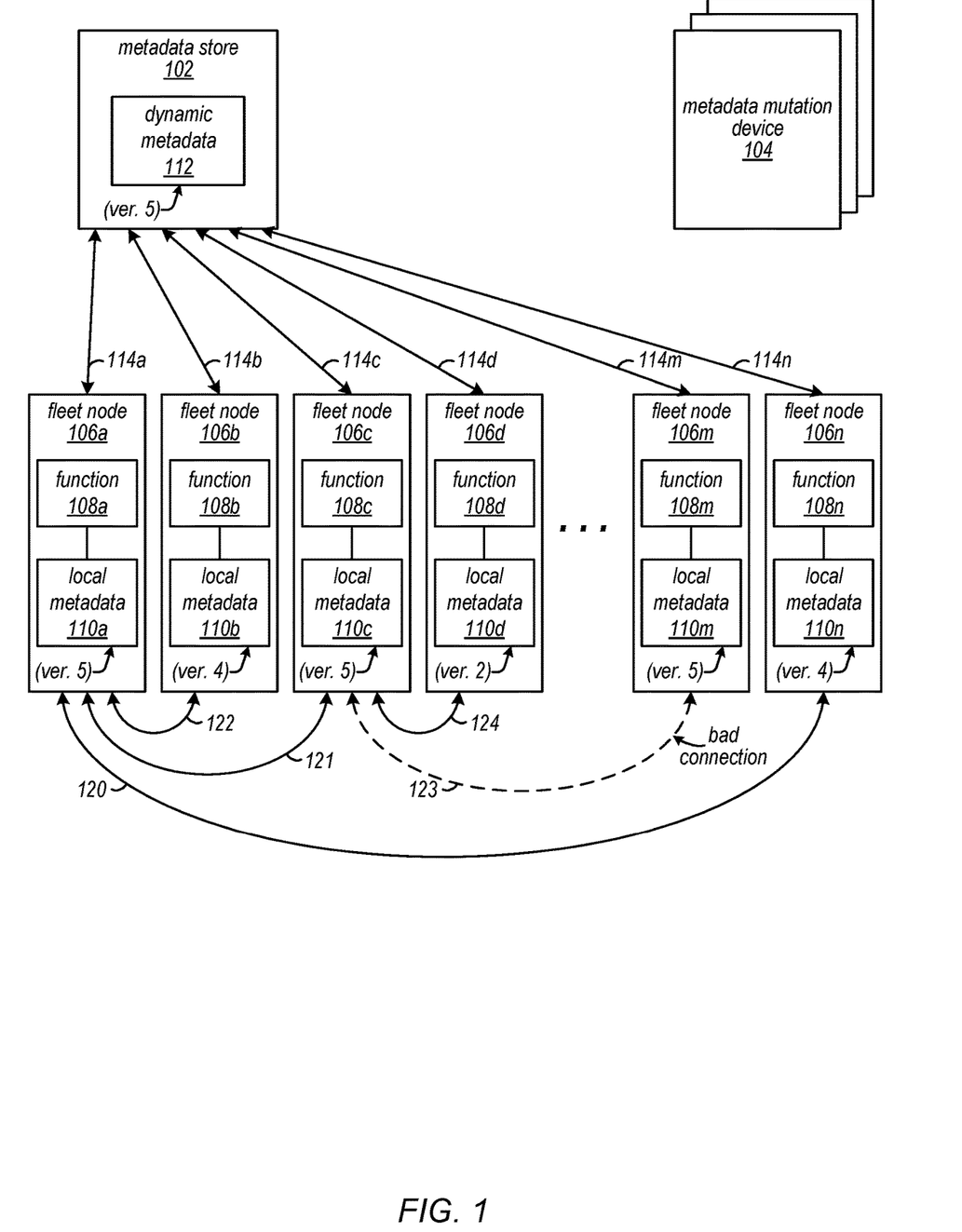
FIG. 1 is a block diagram illustrating a portion of an operation of an example system that manages performance of functions at fleet nodes.

FIG. 1 is a block diagrams illustrating operations of an example system that manages performance of functions at fleet nodes. In this example, the system includes a metadata store 102, one or more metadata mutation devices 104, and a plurality of fleet nodes 106*a-n*. The metadata store 102 includes dynamic metadata 112. The fleet nodes 106*a-n* include respective functions 108*a-n* and respective local metadata 110*a-n*. As described below with reference to FIG. 3, in some embodiments, the system of FIG. 1 is used as part of a network-based service. However, in other embodiments, the system of FIG. 1 is used as part of a closed network.

The metadata store 102 may maintain dynamic metadata 112, which may enable fleet nodes 106a-n to perform respective functions 108a-n, as described herein. The metadata store 102 may periodically communicate with fleet nodes 106a-n via communications 114a-n such that the fleet nodes 106a-n may maintain respective local versions of the dynamic metadata 112 (e.g., local metadata 110a-n). Communications 114a-n may include or indicate various modifications to some or all of the dynamic metadata 112. For example, the communications 114a-n may indicate one or more changes relative to a previous version of the dynamic metadata 112. In some embodiments, the communications 114a-n are initiated by (e.g., periodically broadcast from) the metadata store 102. In some embodiments, the communications 114a-n are initiated by (e.g., provided in response to one or more metadata requests from) the respective fleet nodes 106a-n. A period of the communications 114a-n may be unrelated to a cycle of the gossip protocol described herein, may be based on the cycle of the gossip protocol, or the cycle of the gossip protocol may be based on the period of the communications 114a-n. In some embodiments, the system does not assume that every communication between the metadata store 102 and a particular fleet node (e.g., the fleet node 106a) is received. However, fleet nodes 106a-n may be expected to have received updates to the local metadata 110a-n after a certain amount of time (e.g., corresponding to multiple communications 114a-n).

The metadata mutation device 104, as further described below with reference to FIG. 2, may determine whether to modify the dynamic metadata 112 based on a global state of the local metadata at some or all of the fleet nodes 106a-n.

The fleet nodes 106a-n may perform functions 108a-n (e.g., routing functions) based at least in part on the local metadata 110a-n. Additionally, as described above, the fleet nodes 106a-n may be expected to update the local metadata 110a-n based on updates to the dynamic metadata 112 within a certain period of time (e.g., a gossip group time threshold). However, the fleet nodes 106a-n may not halt performing the functions 108a-n or otherwise enter an error state merely because the fleet nodes 106a-n have not communicated with the metadata store for the certain period of time. For example, the dynamic metadata 112 may not be updated for longer than the certain period of time, and thus, even if the fleet node 106a fails to communicate with the metadata store 102 for the certain period of time, the local metadata 110a may match the dynamic metadata 112 and the function 108a may be performed correctly (e.g., according to the dynamic metadata 112).

The fleet nodes 106a-n may perform a gossip protocol to determine whether the fleet nodes 106a-n should continue to perform the respective functions 108a-n. During a gossip group time threshold (e.g., a time to live (TTL) period of the fleet nodes 106a-n), the fleet nodes 106a-n may send metadata version information requests (e.g., sent as part of metadata version communications 120-124) to at least a quantity of other fleet nodes of the plurality of fleet nodes 106a-n, where the quantity is at least equal to a gossip group size threshold. The fleet nodes 106a-n may identify the quantity using an internal list of fleet nodes, using a random selection of active fleet nodes received from another device (e.g., a front end of the system), using an assigned group of fleet nodes, or using another method. In some embodiments, the quantity may include fleet nodes 106a-n in a failure mode. In the illustrated embodiment, the quantity is three and the gossip group size threshold, as discussed further below with reference to FIG. 2, is also three. In the illustrated embodiment, for clarity, all three metadata version information requests (e.g., sent as part of metadata version communications 120-124) are only shown for fleet nodes 106a and 106c. However, in the illustrated embodiment, each of fleet nodes 106a-n may send at least three metadata version information requests. In some embodiments, one or more fleet nodes (e.g., fleet node 106b) may send more metadata version information requests than one or more other fleet nodes (e.g., fleet node 106a).

In response to the metadata version information requests, the fleet nodes 106a-n may send metadata version responses within the gossip group time threshold. The metadata version responses (e.g., sent as part of metadata version communications 120-124) may be indicative of versions of the local metadata 110a-n. The fleet nodes 106a-n may use the received metadata version responses determine whether respective local metadata 110a-n is stale, indeterminate, or both based on the received metadata version responses. Having respective local metadata 110a-n that is stale, indeterminate, or both may cause the respective fleet nodes 106a-n to enter a failure mode, as discussed further below.

In particular, in response to receiving a metadata version response, the fleet nodes 106a-n may determine whether the received metadata version response indicates a version of the dynamic metadata 112 that is more recent that the respective local metadata 110a-n by at least a staleness threshold (e.g., 2 versions). Additionally, the fleet nodes 106a-n may determine, based at least in part on the metadata version responses, whether the local metadata 110a-n is indeterminate. The fleet nodes 106a-n may determine that the local metadata 110a-n is indeterminate in response to receiving fewer than the gossip group size threshold of metadata version responses within the gossip group time threshold. In situations where the respective local metadata 110a-n is stale, indeterminate, or both, the fleet nodes 106a-n may halt performance of one or more functions (e.g., the respective functions 108a-n). Halting performance of the one or more functions may include, in response to receiving a request to perform the one or more functions, sending an error message. In response to determining that the local metadata 110a-n is not stale and is not indeterminate, the fleet nodes 106a-n may continue performance of the one or more functions. The fleet nodes 106a-n may be configured to request the metadata version information, to determine whether the respective local metadata 110a-n is stale, and to determine whether the respective local metadata 110a-n is indeterminate at least once per gossip group time threshold. Accordingly, the fleet nodes 106a-n may manage performance of the functions 108a-n and may detect potential errors relating to staleness or indeterminateness of the local metadata 110a-n.

To illustrate, in the illustrated embodiment, the fleet node 106a contacts fleet nodes 106b, 106c, and 106n via metadata version communications 120, 121, and 122. Because none of the fleet nodes 106b, 106c, and 106n have local metadata having a version newer than the version of the local metadata 110a (version 5) by at least a staleness threshold (e.g., at least two versions newer, so version 7 or later), the fleet node 106a may determine that the local metadata 110a is not stale. Additionally, because at least the gossip group size threshold (e.g., three) of metadata version responses were received within the gossip group time threshold, the fleet node 106a may determine that the local metadata 110a is not indeterminate. Accordingly, the fleet node 106a may determine to continue performance of the function 108a.

As another example, in the illustrated embodiment, the fleet node 106*c* contacts fleet nodes 106*a*, 106*d*, and 106*m* via metadata version communications 121, 123, and 124. However, in the illustrated embodiment, metadata version communication 123 is sent along a bad connection and a corresponding metadata version response is not received. Accordingly, the fleet node 106*c* may receive fewer metadata version responses (e.g., two) than the gossip group size threshold (e.g., three). Thus, the fleet node 106*c* may determine that the local metadata 110*c* is indeterminate and may halt performance of the function 108*c*.

As another example, the fleet node 106*d* may contact the fleet node 106*c* via the metadata version communication 124. The fleet node 106*d* may determine that the metadata version response indicates that the version of the local metadata 110*c* (version 5) is newer than the version of the local metadata 110*d* (version 2) by at least the staleness threshold and thus determine that the local metadata 110*d* is stale. The fleet node 106*d* may halt performance of the function 108*d*.

In various embodiments, after halting performance of the function 108*a* because the local metadata 110*a* is stale, the fleet node 106*a* may receive an update to the local metadata 110*a*. In response to receiving the update to the local metadata 110*a*, the fleet node 106*a* may resume performance of the function 108*a*.

The staleness and indeterminateness of the local metadata 110*a-n* may be tracked separately regarding multiple portions of the dynamic metadata 112. In other words, in some embodiments, the fleet node 106*a* may determine that one portion of the local metadata 110*a* corresponding to one portion of the dynamic metadata 112 is stale but may also determine that another portion of the local metadata 110*a* corresponding to another portion of the dynamic metadata 112 is not stale or indeterminate. The fleet nodes 106*a-n* may halt performance of the functions 110*a-n* corresponding to (e.g., using) one or more portions of the local metadata 110*a-n* that are stale, indeterminate, or both, and may continue performance of the functions 110*a-n* corresponding to one or more portions of the local metadata 110*a-n* that are not stale and that are not indeterminate.

Although in the illustrated embodiment the fleet nodes 106*a-n* receive updates to the local metadata 110*a-n* using the communications 114*a-n*, in other embodiments, in response to receiving a metadata version response from another fleet node indicative of a newer version of the respective local metadata a-n, the fleet nodes 106*a-n* may obtain the newer version of the local metadata from the corresponding fleet node. For example, in response to the fleet node 106*d* receiving, via the metadata version communication 124, the metadata version response from the fleet node 106*c* indicating version 5 of the local metadata, the fleet node 106*d* may obtain the corresponding updates from the fleet node 106*c*, as opposed to from the metadata store 102. Accordingly, updates to the local metadata 110*a-n* may be sent to the fleet nodes 106*a-n* without communications with the metadata store (e.g., if the metadata store 102 experiences an error and is offline).

In some embodiments, various portions of the system described herein may be configurable or may be automatically adjusted. For example, the gossip group time threshold may be varied based on a system setting. In some cases, the gossip group time threshold may be set to be very large such that the fleet nodes 106*a-n* are not determined to be indefinite. As another example, the gossip group size threshold may be configurable or may be determined based on a number of the fleet nodes 106*a-n* that determined to continue to perform the respective functions 108*a-n* during a previous gossip group time threshold.

Figure 2:
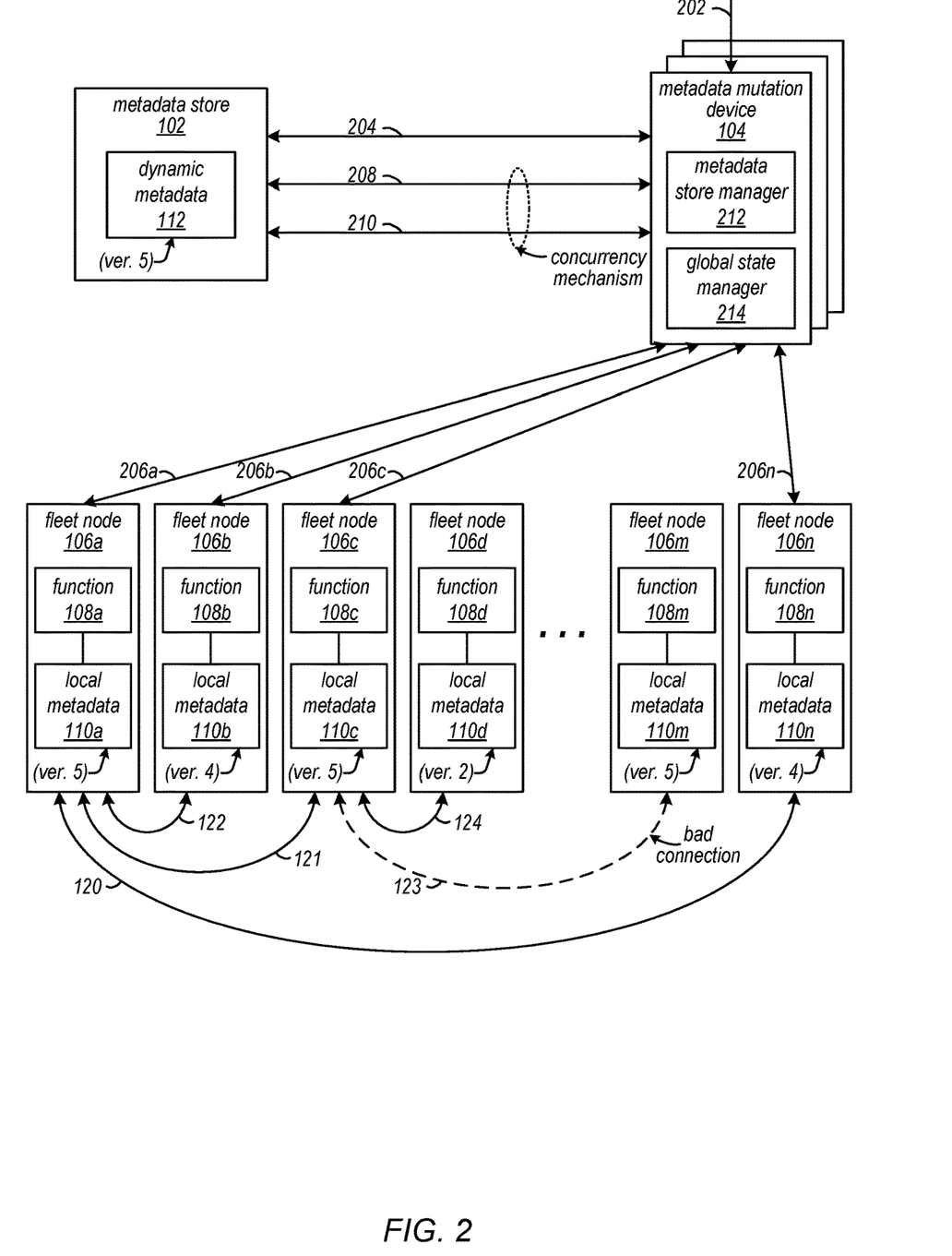
FIG. 2 is a block diagram illustrating a portion of an operation of an example system that manages updates to metadata of fleet nodes.

FIG. 2 is a block diagrams illustrating operations of an example system that manages updates to metadata of fleet nodes. In the illustrated embodiment, many of the same devices and interactions from FIG. 1 are illustrated. For example, the system includes the metadata store 102, the one or more metadata mutation devices 104, and the plurality of fleet nodes 106*a-n* of FIG. 1. The metadata store 102 includes the dynamic metadata 112. The fleet nodes 106*a-n* include respective functions 108*a-n* and respective local metadata 110*a-n*. Additionally, the metadata version communications 120-124 are shown. However, in other embodiments, one or more of the devices, interactions, or both that also appear in FIG. 1 differ from the devices and interactions discussed in FIG. 1. As discussed above with reference to FIG. 1, various portions of the system described herein may be similarly adjusted. Further, the metadata mutation device 104 illustrated in FIG. 2 includes a metadata store manager 212 and a global state manager 214. In some embodiments, the metadata mutation device 104 of FIG. 1 similarly includes the metadata store manager 212, the global state manager 214, or both. In other embodiments, the metadata mutation device 104 of FIG. 1 does not include the metadata store manager 212, the global state manager 214, or both.

As described above, the metadata mutation device 104, may determine whether to modify the dynamic metadata 112 based on a global state of the local metadata at some or all of the fleet nodes 106*a-n*. The metadata mutation device 104 may use the metadata store manager 212 to communicate with and control the versions of the dynamic metadata 112 based on the global state of the some or all of the fleet nodes 106*a-n*. The metadata mutation device 104 may use the global state manager 214 to communicate with the some or all of the fleet nodes 106*a-n*, aggregate responses from the some or all of the fleet nodes 106*a-n*, and determine the global state of the some or all of the fleet nodes 106*a-n*. In particular, the metadata mutation device 104 may receive a metadata modification request 202 that indicates a desired modification to the dynamic metadata 112. Alternatively, the metadata mutation device 104 may identify the desired modification. Regardless, the metadata mutation device 104 may determine the desired modification to the dynamic metadata 112. In response to determining the desired modification, the metadata mutation device 104 may identify, using the metadata store manager 212 via version communication 204, a current dynamic metadata state (e.g., a version of the dynamic metadata 112) at the metadata store 102.

Subsequent to identifying the current dynamic metadata state, the global state manager 214 of the metadata mutation device 104 may request, from a quantity of the fleet nodes 106*a-n* via the global state communications 206*a-n*, metadata information. The quantity may include at least a mutation node check threshold of the fleet nodes. The mutation node check threshold may be related to a gossip group size of the fleet nodes. In particular, the gossip group size may correspond to a number of nodes communicating regarding the respective local metadata 110*a-n* as part of the gossip protocol discussed above with reference to FIG. 1. The gossip group size is one larger than the gossip group size threshold (i.e., representing all of the fleet nodes communicated with as well as the instant fleet node). The mutation node check threshold may be inversely related to the gossip group size such that the mutation node check threshold exceeds the total number of fleet nodes minus the gossip group size. In other words, assuming self-contained gossip groups (e.g., in a gossip group size of three, fleet nodes 106*a*-*d* only communicate with each other), the metadata mutation device 104 communicates with, via the global state manager 214, at least one of the fleet nodes 106*a*-*n* from each gossip group. Accordingly, the metadata mutation device 104 may obtain the metadata version information regarding the fleet nodes 106*a*-*n*.

For one or more received metadata information responses received from the fleet nodes 106*a*-*n*, the metadata mutation device 104 may determine whether the respective metadata information responses indicate that a corresponding local metadata version is within a freshness threshold, where the freshness threshold indicates a number of versions older than the current dynamic metadata state of the dynamic metadata 112. In other words, the system may be set up such that the metadata store manager 212may modify the dynamic metadata 112 even if one or more of the fleet nodes 106*a*-*n* store local metadata that is older than the current dynamic metadata state, depending on a scope of changes applied to the modifications. For example, one or more addresses corresponding to one or more storage devices being assigned new addresses in a modification may not be used for several versions so the fleet nodes 106*a*-*n* do not incorrectly attempt to route data to incorrect storage devices based on obsolete local metadata.

In response to the global state manager 214 receiving fewer than the mutation node check threshold of metadata responses (e.g., via the global state communications 206*a*-*n*) indicative of corresponding local versions within a freshness threshold, the metadata mutation device 104 may determine not to modify the dynamic metadata 112. Alternatively, in response to receiving at least the mutation node check threshold of metadata responses indicative of corresponding local versions within the freshness threshold, the metadata mutation device 104 may modify the dynamic metadata 112 via the modification request 210. Additionally, prior to determining not to modify the dynamic metadata 112, if fewer than all of the fleet nodes have been sent requests for the metadata information, the metadata mutation device 104 may send one or more additional requests for metadata information to one or more of the fleet nodes that have not been sent a request for the metadata information.

In some embodiments, prior to modifying the dynamic metadata 112, the metadata mutation device 104 may wait at least the gossip group time threshold to allow the fleet nodes of fleet nodes 106*a*-*n* that are stale or indeterminate to halt performance of the respective functions. Waiting at least the gossip group time threshold may avoid a negative impact of the desired modification on fleet nodes having out of date local metadata. However, in some embodiments, the metadata mutation device 104 may determine not to wait at least the gossip group time threshold (e.g., if all of the fleet nodes 106*a*-*n* indicate a same metadata version as the dynamic metadata 112).

In various embodiments, multiple metadata mutation devices may operate on the dynamic metadata simultaneously (e.g., using corresponding metadata store managers). As a result, in some cases, to modify the dynamic metadata 112, the metadata mutation device 104 may apply a concurrency mechanism. The concurrency may be optimistic (e.g., may operate using an assumption that the dynamic metadata 112 has not changed subsequent to the version communication 204) or may be pessimistic (e.g., may use a locking mechanism, an atomicity mechanism, etc.). Additionally, the metadata mutation device 104 may verify, via version verification request 208, that the dynamic metadata 112 has not been modified subsequent to the version communication 204. In response to the version verification request 208 indicating that the dynamic metadata 112 has been modified subsequent to the version communication 204, the metadata mutation device 104 may determine not to modify the dynamic metadata 112 or may recalculate a modification to the dynamic metadata 112.

In other embodiments, the various metadata mutation devices may be configured to only modify particular respective portions of the dynamic metadata 112. Accordingly, the various metadata mutation devices may be configured to modify the dynamic metadata 112 without a concurrency mechanism.

Figure 3:
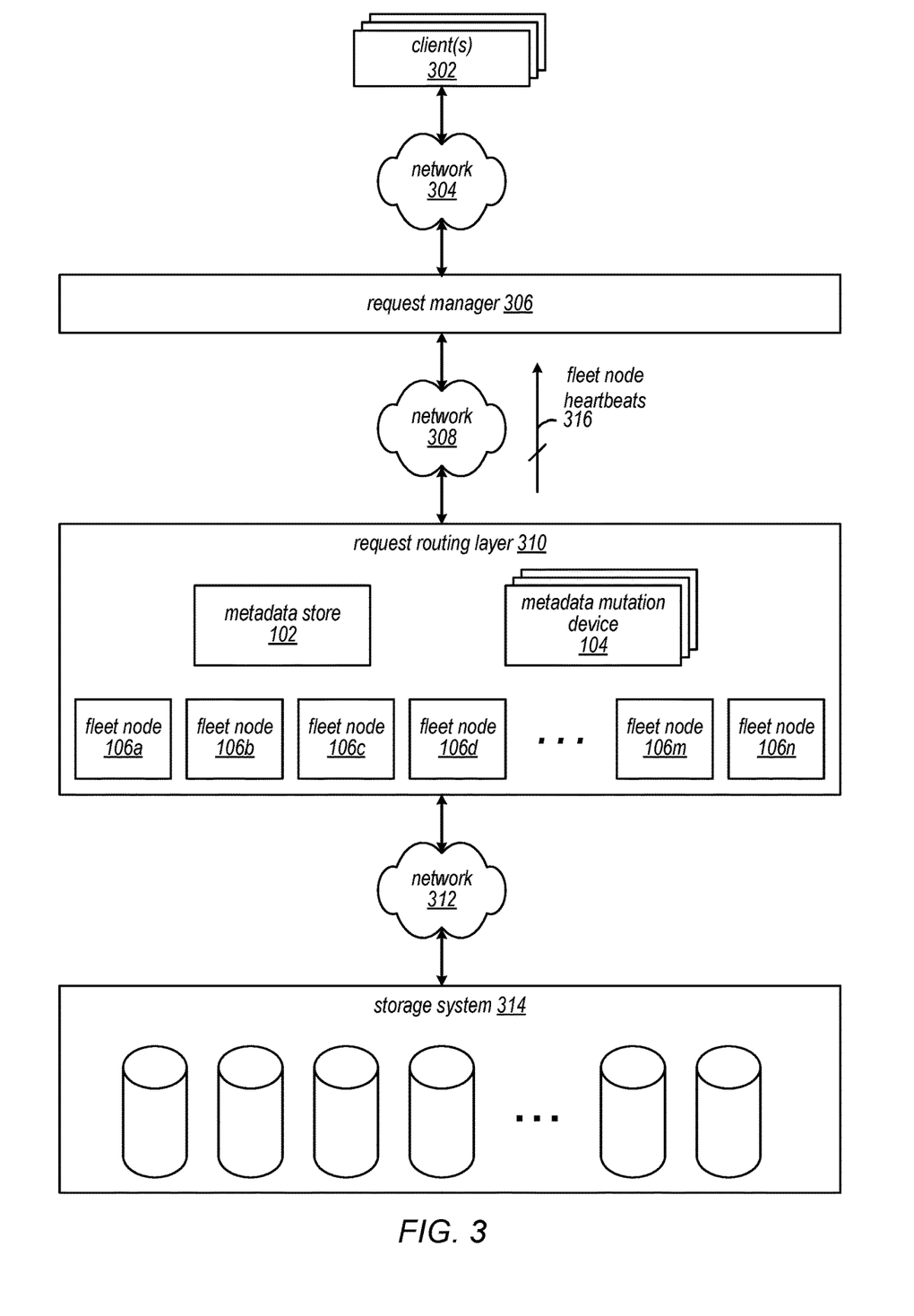
FIG. 3 is a block diagram illustrating a network-based service system architecture that may be configured to process client requests by managing fleet nodes.

FIG. 3 is a block diagram illustrating operations of a network-based service system architecture that may be configured to process client requests by managing fleet nodes. In this example, the system includes the metadata store 102, the one or more metadata mutation devices 104, and the plurality of fleet nodes 106*a*-*n* of FIGS. 1 and 2. However, in other embodiments the metadata store 102, the one or more metadata mutation devices 104, the plurality of fleet nodes 106*a*-*n* or any combination thereof differ from the metadata store 102, the one or more metadata mutation devices 104, and the plurality of fleet nodes 106*a*-*n* discussed in FIGS. 1 and 2. The system also includes one or more clients 302, a request manager 306, a request routing layer 310 that includes the metadata store 102, the one or more metadata mutation devices 104, and the plurality of fleet nodes 106*a*-*n*, and a storage system 314. Additionally, the system includes a network 304 that links the one or more clients 302 to the request manager 306, a network 308 that links the request manager 306 to the request routing layer 310, and a network 312 that links the request routing layer 310 to the storage system 314. In some embodiments, the system includes fewer than three networks (e.g., instead of the networks 304, 308, and 312).

This disclosure will describe a process of receiving a request for a data object, and returning the data object using the illustrated system.

The storage system 314 may be configured to store a plurality of data objects on behalf of various clients. In some embodiments, clients, such as the client 302, may request, to request manager 306 via network 304, a data object stored at the storage system 314 on the client's behalf. Accordingly, in the illustrated embodiment, request manager 306 is configured to receive a request for a data object from client 302.

In response to receiving the request, the request manager 306 may request, from one or more of the fleet nodes 106*a*-*n* (e.g., one or more fleet nodes that are continuing performance of the function) via the network 308, to forward the request for the data object to the storage system 314. The fleet node(s) 106 may forward the request to the storage system 314, where the data object may be obtained and forwarded back to the client 302 via the request routing layer 310 and the request manager 306.

The fleet node 106 may forward the request to the storage system 314 by using corresponding local metadata to identify a path through the network 312 to one or more portions of the storage system 314. Accordingly, a modification to the corresponding local metadata may cause the fleet node to identify another location within the network 312 by using the obsolete local metadata. However, this potential problem may be detected and prevented using, for example, the gossip protocol described above with respect to FIG. 1, the mutation protocol described above with respect to FIG. 2, or both.

As noted above, the fleet nodes 106*a*-*n* may determine whether to halt performance of one or more functions or to continue performance of the one or more functions. In some embodiments, halting performance of the one or more functions includes halting one or more heartbeat notifications (e.g., fleet node heartbeats 316) that indicate that the respective fleet node is available to perform the one or more functions. Similarly, in some embodiments, continuing performance of the one or more functions includes periodically sending the one or more heartbeat notifications (e.g., fleet node heartbeats 316) to indicate that the fleet node is available to perform the one or more functions. In response to the one or more heartbeat notifications, the fleet node may receive one or more requests to perform the one or more functions. In some cases, if fewer than a heartbeat threshold number of metadata version responses are received within a heartbeat time threshold prior to the gossip group time threshold, the fleet node may preemptively halt one or more heartbeat notifications (e.g., so requests to perform the function are less likely to be received after the fleet node determining that the corresponding local metadata is indeterminate). For example, the fleet node 106a may be configured to pre-emptively halt the one or more heartbeat notifications (e.g., fleet node heartbeats 316) in response to receiving fewer than five metadata version responses in the first 50 seconds of a corresponding gossip group time threshold of 60 seconds when the gossip group size is twenty.

Figure 4:
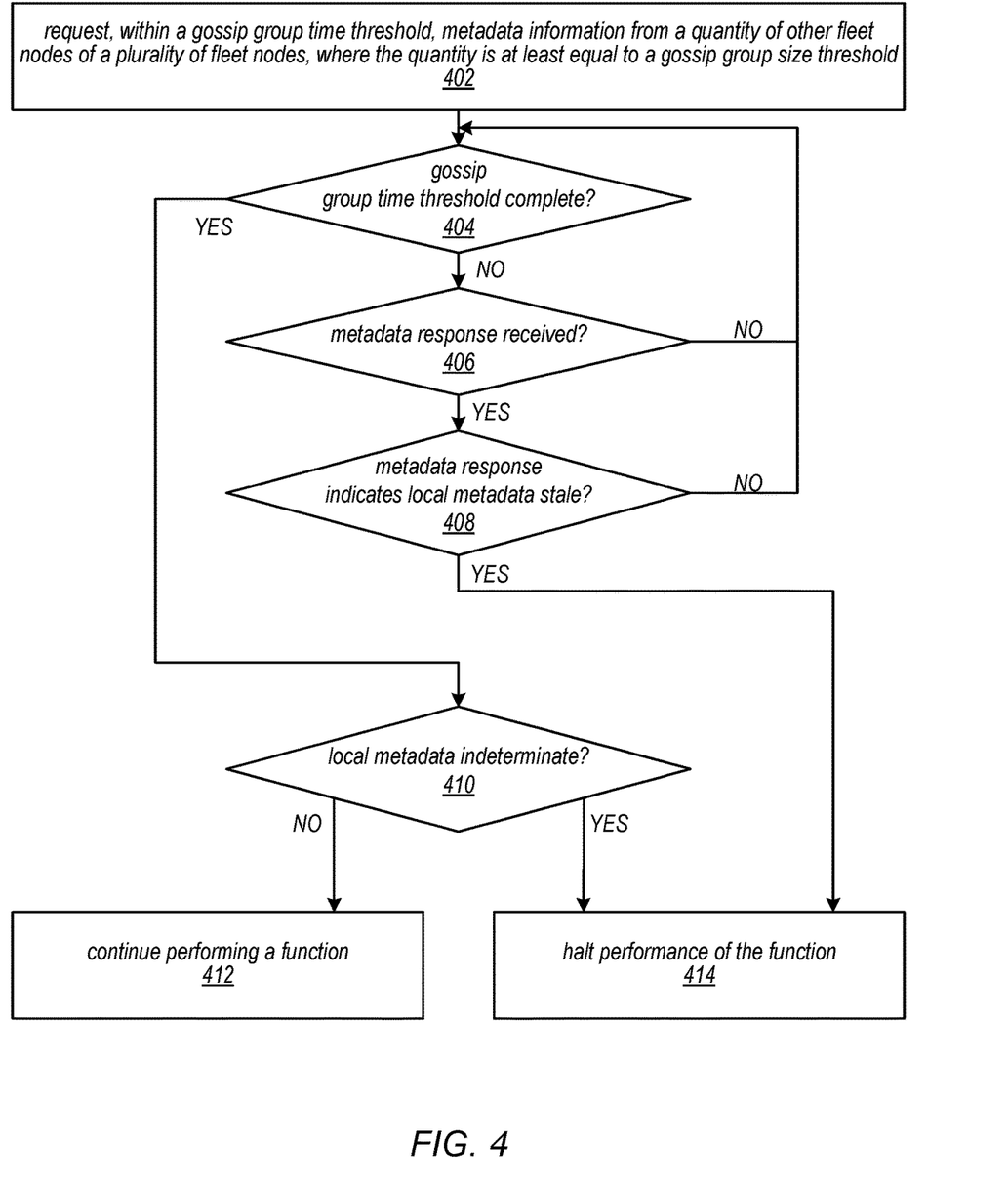
FIG. 4 is a flow diagram illustrating one embodiment of a method for determining whether to continue performing a function.

As described above, in one example of fleet node management system, the fleet nodes may determine respective local metadata is stale or indeterminate. Based on determining whether the respective local metadata is stale, indeterminate, or both, the fleet nodes may determine whether to continue performing a function. One embodiment of a method for determining whether to continue performing a function is illustrated by the flow diagram of FIG. 4. Although FIG. 4 illustrates operations being performed in a particular order, in other embodiments, some operations may be performed in other orders or in parallel.

As illustrated at 402, in this example, the method may include requesting, within a gossip group time threshold, metadata information from a quantity of other fleet nodes of a plurality of fleet nodes, where the quantity is at least equal to a gossip group size threshold. For example, the fleet node 106a may request, from the fleet nodes 106b, 106c, and 106n, corresponding metadata information. As illustrated at 404, in this example, the method may include determining whether the gossip group time threshold is complete.

In response to the gossip group time threshold being complete, the method may proceed to 410 below. Otherwise, in this example, the method may include, at 406, determining whether a metadata response has been received from at least one of the quantity of other fleet nodes. In response to no metadata response being received, the method may return to 404. Otherwise, the method may proceed to 408. For example, in response to the fleet node 106a may receive a metadata response from the fleet node 106b, the method may proceed to 408.

As illustrated at 408, in this example, the method may include determining whether the metadata response indicates that corresponding local metadata is stale. If the metadata response indicates that the local metadata is stale, the method may proceed to 414. Otherwise, the method may return to 404. For example, in response to the metadata response from the fleet node 106b not indicating that the local metadata 110a is stale, the fleet node 106a may continue to wait for the gossip group time threshold to complete. As illustrated at 410, in this example, the method may include in response to the gossip group time threshold being complete, determining whether the local metadata is indeterminate. For example, in response to the fleet node 106a failing to receive at least a gossip group size threshold of metadata responses in the gossip group time threshold, the fleet node 106a may determine that the local metadata 110a is indeterminate. Alternatively, in response to the fleet node 106a receiving at least the gossip group size threshold of metadata responses in the gossip group time threshold, the fleet node 106a may determine that the local metadata 110a is not indeterminate.

As illustrated at 412, in this example, in response to determining that the local metadata is not indeterminate, continuing performing a function. For example, in response to determining that the local metadata 110a is not indeterminate and not stale, the fleet node 106a may continue performing the function 108a. As illustrated at 414, in this example, in response to a metadata response indicating that the local metadata is stale or in response to determining that the local metadata is indeterminate, halting performance of the function. For example, in response to determining that the local metadata 110a is indeterminate, stale, or both, the fleet node 106a may halt performance of the function 108a. Thus, the method of FIG. 4 may enable determining whether to continue performing a function at a fleet node.

Although the method illustrated in FIG. 4 shows implementation of a "fixed window" protocol in which the method determines, at 404, whether the gossip group time threshold is complete prior to determining, at 410, whether the local metadata is indeterminate, in other embodiments, other implementations may be used. For example, the method may implement a "sliding window" protocol where the fleet node may continuously (e.g., at various timings within a gossip group time threshold) exchange version information with other fleet nodes and the method may determine, at various timings, whether the gossip group size of metadata responses have been received within a gossip group time threshold amount of time. Accordingly, determinations regarding whether the local metadata is indeterminate may not be made only at the end of the gossip group time threshold.

Figure 5:
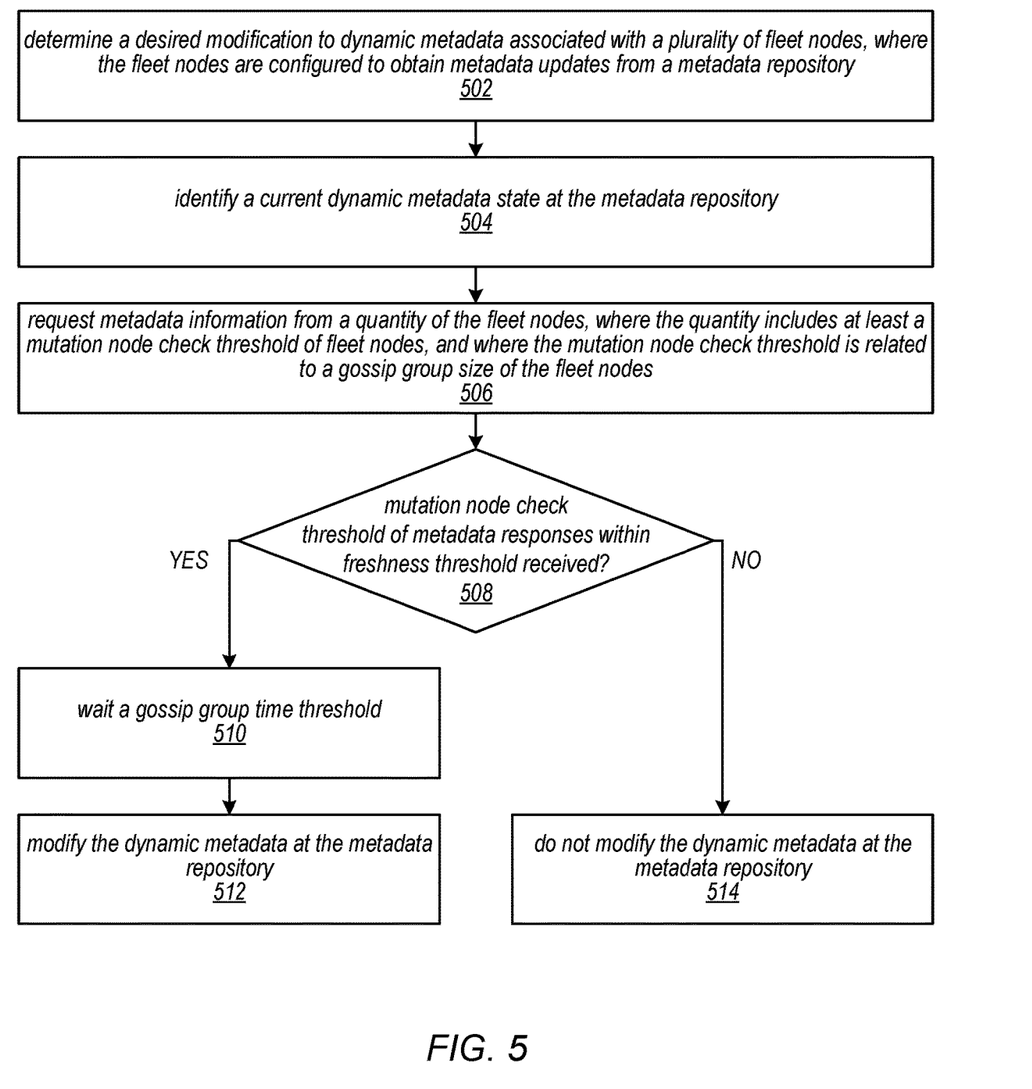
FIG. 5 is a flow diagram illustrating one embodiment of a method for determining whether to modify metadata for a plurality of fleet nodes.

As described above, in one example of a fleet node management system, a metadata mutation device may determine a global state of the fleet nodes. Based on the global state, the metadata mutation device may determine whether to modify metadata for the fleet nodes. One embodiment of a method for determining whether to modify metadata for a plurality of fleet nodes is illustrated by the flow diagram of FIG. 5. Although FIG. 5 illustrates operations being performed in a particular order, in other embodiments, some operations may be performed in other orders or in parallel.

As illustrated at 502, in this example, the method may include determining a desired modification to dynamic metadata associated with a plurality of fleet nodes, where the fleet nodes are configured to obtain metadata updates from a metadata repository. For example, the metadata mutation device 104 may determine a desired modification to the dynamic metadata 112, where the fleet nodes 106a-n are configured to obtain metadata updates from the metadata store 102. As illustrated at 504, in this example, the method may include identifying a current dynamic metadata state at the metadata repository. For example, the metadata mutation device 104 may request a current version of the dynamic metadata 112.

As illustrated at 506, in this example, the method may include requesting metadata information from a quantity of the fleet nodes, where the quantity includes at least a mutation node check threshold of fleet nodes, and where the mutation node check threshold is related to a gossip group size of the fleet nodes. For example, the metadata mutation device 104 may request metadata information from the fleet nodes 106a, 106b, 106c, and 106n. As illustrated at 508, in this example, the metadata mutation device may determine whether a mutation node check threshold of metadata responses within a freshness threshold have been received. For example, the metadata mutation device 104 may determine whether at least four responses have been received that indicate respective versions that are at most one version older than a version of the dynamic metadata 112. As discussed further below, the decision of 508 may be performed in several ways and one such example is provided.

As illustrated at 510, in this example, in response to at least the mutation node check threshold of metadata responses indicating versions within the freshness threshold being received, the method may include waiting a gossip group time period. For example, the metadata mutation device 104 may wait a gossip group time period to avoid a negative impact of the desired modification on fleet nodes having out of date local versions. As noted above, in some cases, the gossip group time threshold may not be waited and the method may proceed from 508 to 512. As illustrated at 512, in this example, the method may include modifying the dynamic metadata at the metadata repository. For example, the metadata mutation device 104 may modify the dynamic metadata 112.

As illustrated at 514, in this example, in response to in response to at least the mutation node check threshold of metadata responses indicating versions not within the freshness threshold being received, the method may include not modifying the dynamic metadata at the metadata repository. For example, the metadata mutation device 104 may not modify the dynamic metadata 112. Thus, the method of FIG. 5 may enable determining whether to modify metadata for a plurality of fleet nodes.

As noted above, there are several ways to determine whether the mutation node check threshold of metadata responses within the freshness threshold have been received. For example, prior to receiving metadata responses of every fleet node of the quantity, the metadata mutation device may determine not to modify the dynamic metadata in response to determining that at least a particular number of metadata responses indicative of corresponding local versions not within the freshness threshold have been received. In this example, the particular number may be greater than a difference between the quantity and the mutation node check threshold (e.g., there are an insufficient number of remaining fleet nodes that meet the freshness threshold to determine to modify the dynamic metadata). As a similar example, prior to receiving metadata responses of every fleet node of the quantity, the metadata mutation device may determine to modify the dynamic metadata in response to determining that at least the mutation node check threshold of metadata responses indicative of corresponding local versions within the freshness threshold have been received.

Figure 6:
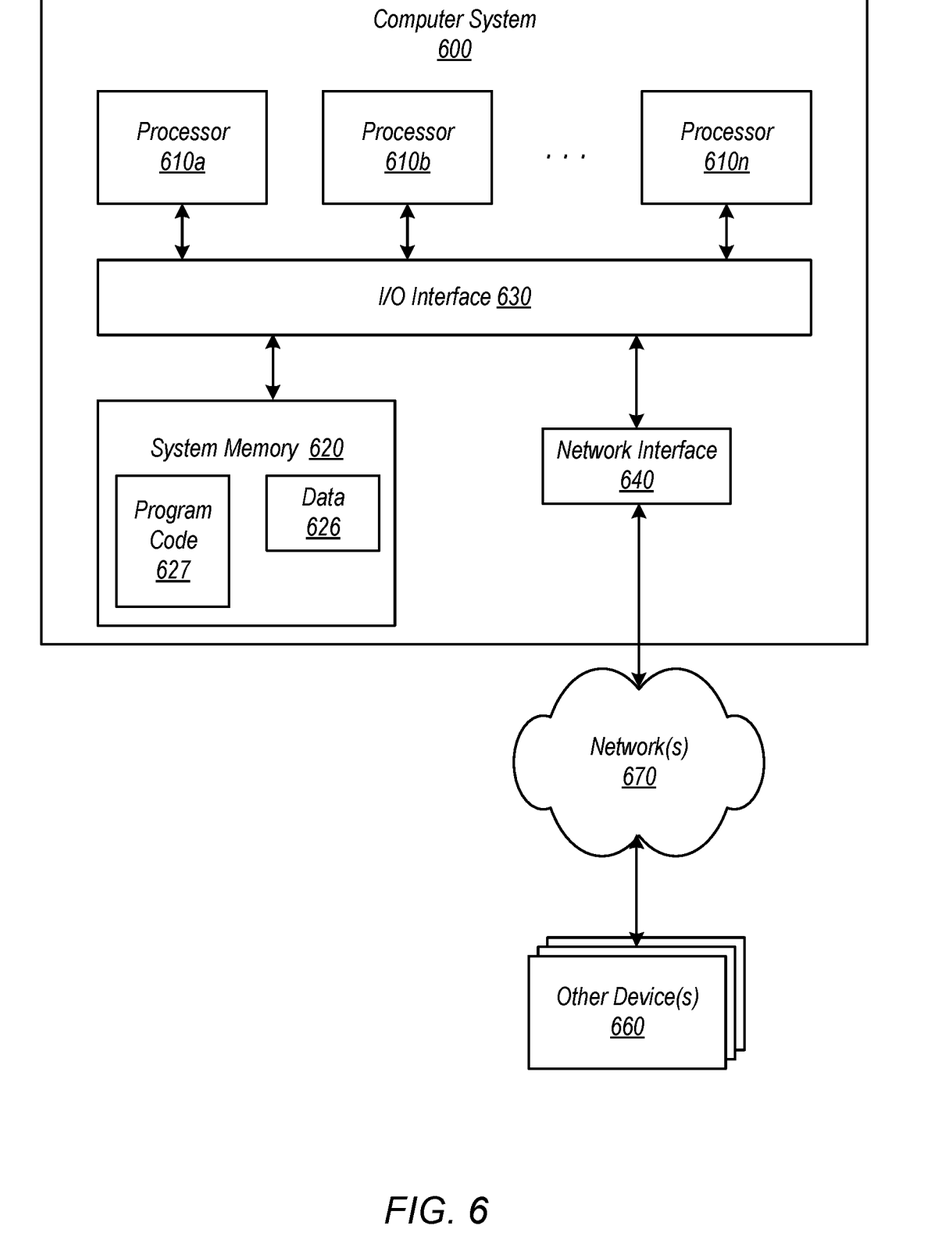
FIG. 6 is a block diagram illustrating one embodiment of a computer system configured to implement at least a portion of a system that manages fleet nodes, as described herein.

One embodiment of a computer system configured to implement at least a portion of a fleet node management system as described above with reference to FIGS. 1-5 is shown in FIG. 6. In at least some embodiments, a server that implements a portion or all of the methods and apparatus for a fleet node management system as described herein may include a general-purpose computer system that includes or is configured to access one or more computer-accessible media, such as a computer system 600 illustrated in FIG. 6. In the illustrated embodiment, the computer system 600 includes one or more processors 610a-n coupled to a system memory 620 via an input/output (I/O) interface 630. The computer system 600 further includes a network interface 640 coupled to the I/O interface 630.

In various embodiments, the computer system 600 may be a uniprocessor system including one processor 610a, or a multiprocessor system including several processors 610a-n (e.g., two, four, eight, or another suitable number). The processors 610a-n may be any suitable processors capable of executing instructions. For example, in various embodiments, the processors 610a-n may be general-purpose or embedded processors implementing any of a variety of instruction set architectures (ISAs), such as the x86, PowerPC, SPARC, or MIPS ISAs, or any other suitable ISA. In multiprocessor systems, each of the processors 610a-n may commonly, but not necessarily, implement the same ISA.

System memory 620 may be configured to store instructions and data accessible by the processor(s) 610. In various embodiments, the system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for implementing a fleet node management system, are shown stored within the system memory 620 as program code 627 and data 626. For example, the program code 627 may, when executed by a processor, cause the processor to implement at least a portion of functions of the metadata store 102, the metadata mutation device 104, at least one of the fleet nodes 106a-n, or any combination thereof.

In one embodiment, the I/O interface 630 may be configured to coordinate I/O traffic between a processor 610, the system memory 620, and any peripheral devices in the device, including the network interface 640 or other peripheral interfaces. In some embodiments, the I/O interface 630 may perform any necessary protocol, timing or other data transformations to convert data signals from one component (e.g., the system memory 620) into a format suitable for use by another component (e.g., a processor 610). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of the I/O interface 630 may be split into two or more separate components, such as a north bridge and a south bridge, for example. Also, in some embodiments some or all of the functionality of the I/O interface 630, such as an interface to the system memory 620, may be incorporated directly into a processor 610.

The network interface 640 may be configured to allow data to be exchanged between the computer system 600 and other devices 660 attached to a network or networks 670, such as other computer systems or devices as illustrated or described in FIGS. 1 through 5, for example. In various embodiments, the network interface 640 may support communication via any suitable wired or wireless general data networks, such as types of Ethernet network, for example. Additionally, the network interface 640 may support communication via telecommunications/telephony networks such as analog voice networks or digital fiber communications networks, via storage area networks such as Fibre Channel SANs, or via any other suitable type of network and/or protocol.

In some embodiments, the system memory 620 may be one embodiment of a computer-accessible medium configured to store program instructions and data as described above for FIGS. 1 through 6 for implementing embodiments of a fleet node management system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 600 via the I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 600 as the system memory 620 or another type of memory. Further, a computer-accessible medium may include transmission media or signals such as electrical, electromagnetic, or digital signals, conveyed via a communication medium such as a network and/or a wireless link, such as may be implemented via the network interface 640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by a fleet node implemented by one or more computing devices and configured to perform one or more functions and store a local version of metadata that is used to perform the one or more functions:
requesting, within a gossip group time threshold, metadata version information from a quantity of multiple fleet nodes of a plurality of fleet nodes, wherein the quantity is at least equal to a gossip group size threshold;
in response to receiving a metadata version response from at least one of the multiple fleet nodes within the gossip group time threshold, determining whether the local version is stale based at least in part on whether the metadata version response indicates a version of the metadata that is more recent than the local version by at least a staleness threshold;
determining whether the local version is indeterminate based at least in part on whether at least the gossip group size threshold of metadata version responses were received from the multiple fleet nodes within the gossip group time threshold; and
halting the fleet node from further performance of the one or more functions if the local version is stale, indeterminate, or both; or
continuing further performance of the one or more functions by the fleet node if the local version is not stale and is not indeterminate.

2. The method of claim 1, wherein halting further performance of the one or more functions comprises halting, by the fleet node, one or more heartbeat notifications that indicate that the fleet node is available to perform the one or more functions.

3. The method of claim 2, wherein continuing performance of the one or more functions comprises:
sending one or more heartbeat notifications that indicate that the fleet node is available to perform the one or more functions; and
in response to the one or more heartbeat notifications, receiving one or more requests to perform at least one of the one or more functions.

4. The method of claim 3, further comprising:
subsequent to determining that the local version is stale, receiving, by the fleet node, an update to the local version; and
based at least in part on receiving the update to the local version, resuming, by the fleet node, performance of the one or more functions.

5. The method of claim 4, wherein halting further performance of the one or more functions if the local version is stale comprises:
halting further performance of one or more functions corresponding to one or more portions of the local version of the local version that are stale; and
continuing further performance of one or more functions corresponding to one or more other portions of the local version that are not stale and not indeterminate.

6. The method of claim 5, further comprising, in response to determining, based on a metadata version response from a different fleet node, that the local version is stale, requesting, by the fleet node, one or more metadata updates from the different fleet node.

7. The method of claim 5, further comprising receiving, at the fleet node, updates to the local version of the metadata broadcasted from a metadata store.

8. The method of claim 5, further comprising receiving, at the fleet node, updates to the local version of the metadata in response to one or more metadata requests, from the fleet node, to a metadata store.

9. A system, comprising:
a particular fleet node implemented by one or more computing devices and configured to perform one or more functions and store respective local versions of dynamic metadata that is used to perform the one or more functions, and configured to:
request, within a gossip group time threshold, metadata version information from a quantity of multiple fleet nodes of a plurality of fleet nodes, wherein the quantity is at least equal to a gossip group size threshold;
in response to receiving a metadata version response from at least one of the multiple fleet nodes within the gossip group time threshold, determine whether the local version is stale based at least in part on whether the metadata version response indicates a version of the dynamic metadata that is more recent than the local version by at least a staleness threshold;

determine whether the local version is indeterminate based at least in part on whether at least the gossip group size threshold of metadata version responses were received from the multiple fleet nodes within the gossip group time threshold;

in response to determining that the local version is stale, indeterminate, or both, halt the particular fleet node from further performance of a function of the one or more functions, wherein the function is dependent on the local version; and in response to determining that the local version is not stale and is not indeterminate, continue further performance of the function by the particular fleet node.

10. The system of claim 9, wherein to perform the function, the particular fleet node is configured to route one or more client requests to one or more storage devices of a plurality of storage devices, and wherein the dynamic metadata is indicative of a plurality of routes to corresponding storage devices.

11. The system of claim 9, wherein the particular fleet node is configured to request the metadata version information, to determine whether the local version is stale, and to determine whether the local version is indeterminate at least once per gossip group time threshold.

12. The system of claim 9, wherein to halt further performance of the function, the particular fleet node is configured to halt one or more heartbeat notifications that indicate that the particular fleet node is available to perform the function.

13. The system of claim 9, wherein to continue further performance of the function, the particular fleet node is configured to:

send one or more heartbeat notifications that indicate that the particular fleet node is available to perform the function; and in response to the one or more heartbeat notifications, receive one or more requests to perform the function.

14. The system of claim 9, further comprising:

one or more metadata mutation devices implemented by one or more respective computing devices, wherein a particular metadata mutation device is configured to:

determine a desired modification to the dynamic metadata;

identify a current dynamic metadata state at a metadata store storing the dynamic metadata;

request metadata information from a quantity of the fleet nodes, wherein the quantity includes at least a mutation node check threshold of the fleet nodes, and wherein the mutation node check threshold is related to the gossip group size threshold;

in response to receiving fewer than the mutation node check threshold of metadata responses indicative of corresponding local versions within a freshness threshold, determine not to modify the dynamic metadata at the metadata store;

in response to receiving at least the mutation node check threshold of metadata responses indicative of corresponding local versions within the freshness threshold, wait a gossip group time threshold to avoid a negative impact of the desired modification on fleet nodes having out of date local versions; and after waiting the gossip group time threshold, modify the dynamic metadata at the metadata store.

15. A non-transitory, computer-readable storage medium storing program instructions that, when executed on one or more computers, cause the one or more computers to implement a particular fleet node to:

request, within a gossip group time threshold, metadata version information from a quantity of multiple fleet nodes of a plurality of fleet nodes, wherein the metadata information pertains to a local version of dynamic metadata stored by the particular fleet node and the quantity is at least equal to a gossip group size threshold;

in response to receiving a metadata version response from a at least one of the multiple fleet nodes within the gossip group time threshold, determine whether the local version is stale based at least in part on whether the metadata version response indicates a version of the dynamic metadata that is more recent than the local version by at least a staleness threshold;

determine whether the local version is indeterminate based at least in part on whether at least the gossip group size threshold of metadata version responses were received from the multiple fleet nodes within the gossip group time threshold;

in response to determining that the local version is stale, indeterminate, or both, halt the particular fleet node from further performance of a function of the particular fleet node, wherein the function is dependent on the local version; and in response to determining that the local version is not stale and is not indeterminate, continue further performance of the function by the fleet node.

16. The non-transitory, computer-readable storage medium of claim 15, wherein to perform the function, the program instructions when executed on the one or more computers cause the particular fleet node to route one or more client requests to one or more storage devices of a plurality of storage devices, and wherein the dynamic metadata is indicative of a plurality of routes to corresponding storage devices.

17. The non-transitory, computer-readable storage medium of claim 15, wherein the program instructions when executed on the one or more computers cause the particular fleet node to request the metadata version information, to determine whether the local version is stale, and to determine whether the local version is indeterminate at least once per gossip group time threshold.

18. The non-transitory, computer-readable storage medium of claim 15, wherein the program instructions when executed on the one or more computers cause the particular fleet node to:

subsequent to determining that the local version is stale, receive an update to the local version; and based at least in part on receiving the update to the local version, resume performance of the one or more functions.

19. The non-transitory, computer-readable storage medium of claim 15, wherein the program instructions when executed on the one or more computers cause the particular fleet node to:

request one or more metadata updates from a different fleet node in response to determining, based on a metadata version response from the different fleet node, that the local version is stale.

20. The non-transitory, computer-readable storage medium of claim 15, wherein the program instructions when executed on the one or more computers cause the particular fleet node to:

receive updates to the local version of the metadata broadcasted from a metadata store that stores the dynamic metadata.

\* \* \* \* \*